Patented Nov. 13, 1928.

1,691,266

UNITED STATES PATENT OFFICE.

LYLE CALDWELL, OF LOS ANGELES, CALIFORNIA, ASSIGNOR TO THE CELITE COMPANY, OF LOS ANGELES, CALIFORNIA, A CORPORATION OF DELAWARE.

PROCESS OF TREATING LIQUIDS.

No Drawing.   Application filed January 27, 1926.   Serial No. 84,247.

This invention relates to an improved treatment of oils, fats, and waxes by means of an inorganic adsorbing and absorbing material, the treatment removing objectionable properties and impurities from such oleaginous materials with much less labor, and chance of error or failure.

The object of this invention is the development of a method of treating oils for the removal of objectionable characteristics so as to produce a salable and refined product. When applied to petroleum oils, the object of the invention is to remove certain sulfur compounds, nitrogen compounds, solids and semi-solid colloidal matters such as asphalts and free carbon and in general to refine such oils or render them more useful.

For purposes of illustration and brevity I shall describe my invention as it pertains to the treatment of mineral or petroleum oils and products derived therefrom, but do not wish to be limited to the treatment of this type of oils only, as my invention can also be successfully applied to the treatment of marine, vegetable and animal oils.

All types of mineral oils, of varying densities and characteristics, require purification before being sold. Gasoline as well as kerosene or lubricating oils require such purification or treatment, the object of such treatment being general improvement in appearance, odor, color, lubricating value, or removal of impurities. Distillates obtained by cracking processes usually require more rigorous treatment than those obtained by simple distillation.

The materials commonly used in the treatment or purification of mineral oils are sulphuric acid at various concentrations, caustic soda, sodium plumbite or "doctor" solution, fuller's earth, bauxite, etc. Oils containing sulfur, such as cracked light distillates, are usually treated with a doctor solution to remove or render the sulfur inoffensive. Recently gasoline distillates have been "sweetened" or refined by treatment with calcium or sodium hypochlorite solution and my invention may be said to be an improvement upon this last mentioned process more directly than any other.

The present calcium hypochlorite solution treatment consists in first making up the hypochlorite solution (usually by dissolving ordinary bleaching powder in water and removing the sediment and insoluble matter) then mixing the hypochlorite solution with the oil to be treated, then removing the solution by settling and then subjecting the treated oil to a water wash. Inasmuch as the hypochlorite solutions are corrosive because of their oxidizing power, this system has its inherent disadvantages.

In some instances sodium hypochlorite solutions have been used, these being prepared by admitting liquid chlorine into an excess of caustic soda solution. In this method the petroleum distillate is admitted to and agitated with the caustic soda solution and the liquid chlorine then admitted. The treated oil is then separated from the hypochlorite solution by settling and usually water washed before storage or other treatment. In this process corrosion is again found to be very troublesome in the lines and fittings.

In distinction to the above described and mentioned processes of treating oils, my invention briefly consists in bringing the oil to be treated in contact with a solid treating agent (not a solution) and then removing the treating agent together with impurities by sedimentation, filtration, or any other suitable means. If desired, the treated oil may be water washed or further purified or refined in any suitable manner, the kind and extent of such purification being, of course, influenced by the character of the oil and the use to which it is to be applied.

The treating agent used by me is a sil'cious compound disclosed in U. S. patent application Serial No. 76,475, filed on December 19, 1925, by H. E. Endres and myself. The process of making the treating agent will be only generally described here as follows: A finely divided silica, preferably diatomaceous earth, is caused to react with an hydroxide of an alkaline earth and water and the product of such reaction calcined so as to leave excess alkaline earth in the form of an oxide. The product is then submitted to the action of chlorine so as to convert the oxide to hypochlorite.

As a modification in the process of manufacturing the treating agent, the product of reaction between the silica and hydroxide of alkaline earth may be partly dried instead of being calcined, so that the excess alkaline earth is in the form of the hydroxide instead of the oxide. This partly dried material is then exposed to the action of chlorine so as to convert the hydrates to hypochlorites and chlorides.

In all instances, however, the treating agent used by me is pulverulent or granular material comprising a silicate of an alkaline earth coated or intimately combined with an hypochlorite of an alkaline earth, and may contain smaller quantities of water, chlorides, oxides, and other compounds, these latter substances not influencing the effectiveness of the material for my purpose to any great extent. For economical reasons lime is generally used as the alkaline earth, and, for physical reasons, diatomaceous earth as the source of silica, so that the treating agent, for purposes of exactitude will be hereafter referred to as made from these ingredients. Such a treating agent comprises calcium silicate, and calcium hypochlorite and may contain calcium chloride, free silica and lime, water, and small quantities of other ingredients usually found as impurities in diatomaceous earth and lime. The treating agent may be so prepared as to contain from only a few percent to about 30% of available chlorine.

The purification of petroleum oils in accordance with my invention may be carried out as follows: To the petroleum oil, for example, cracked gasoline containing sulfur and termed as "sour" gasoline because of the odor imparted thereto by the sulfur compounds, I add a suitable quantity of the above described treating agent. When using a treating agent containing 10% available chlorine I prefer to add from about 120 lbs. to 240 lbs. of treating agent to every 1000 gallons of cracked gasoline, or from about 5 to 10 lbs. of treating agent per barrel of oil. This is the equivalent of adding about 0.5 lb. to 1.0 lb. of available chlorine per barrel of oil. The addition of this prepared treating agent to the oils is best accomplished in the well known agitators or treaters now used in the petroleum industry, but any suitable type of mixer or agitator may be used, the enclosed types being preferable.

The treating agent is then removed from the oil in any suitable manner, for example, by filtration. The treating agent will be retained in the filtering apparatus and will act as a filter aid, removing any solid or semi-solid impurities which may be present while the oil passing through will be found to be "sweet" and free from sulfur compounds as determined by the "doctor" or the "copper corrosion" tests. It may be found to be desirable to give the refined oil a water wash to remove any acid or alkali which may be present and caused by improper control during the treating process.

It will be readily understood that the actual amounts of treating agent used per barrel of oil will be greatly influenced by many factors, among them (1) the chlorine content of the treating agent, (2) the sulfur content of the oil being treated (3) the form or compounds of sulfur present in the oil, and (4) the degree of purification or neutralization required, etc. When for example the treating agent contains 20% available chlorine by weight instead of 10% (as in the above example) the amount of such treating agent used may be reduced by one half. Also when the degree of purification required is not strict and the oil is relatively easy to refine, the amount of 10% chlorine treating agent used may be reduced from 5 lbs. per barrel to only 2 lbs. per barrel. In most instances the amount of treating agent to be used on a particular oil will have to be determined by experiment and the minimum quantity producing the desired results used thereafter, this procedure leading to economical operation and preventing the absorption of excess chlorine by the oil, so that the subsequent water wash may be more readily eliminated.

Straight run, topped, natural, or distilled mineral oils such as kerosenes and gasolines do not require quite as much treating agent as the cracked oils. These distillates may be purified and all sulfur removed therefrom by the adding of treating agent in sufficient quantities to introduce from about 0.05 lb. to 0.3 lb. of chlorine per barrel of oil. Using a treating agent with an available chlorine content of 10% would necessitate the addition of only 0.5 to 3 lbs. of such treating agent per barrel of oil. The process is similar to that described in the prior example, i. e., the treating agent is mixed with the oil to be treated and later removed therefrom together with adsorbed and absorbed impurities. The treated and refined oil may be given a water wash if this is thought desirable.

The mechanism of the process by which my treating agent serves to purify and decolorize petroleum products may be described in an elementary manner, but I do not wish to be limited to my explanation or theory of the process. It may be assumed, however, that the treating agent consists of diatomaceous silica intimately combined and covered with calcium salts such as calcium hypochlorite, chloride, etc. When such treating agent is used on an oil which has previously been acid washed or acid treated or water washed (although such prior treatment is not essential) the calcium hypochlorite hydrolyses forming hypochlorous acid and this in turn decomposes (because of its instability) to form hydrochloric acid and oxygen and other products. This oxidizes the unsaturated bodies and sulfur compounds, for example in more or less the following manner:

$$CS_2 + 8HClO + 2H_2O = 2H_2SO_4 + 8HCl + CO_2$$

The acids which are formed are neutralized by the calcium silicate present as follows:

$$CaSiO_3 + 2HCl = CaCl_2 + H_2SiO_3$$

and $$CaSiO_3 + H_2SO_4 = CaSO_4 + H_2SiO_3$$

The silicic acid formed is adsorptive and in this particular resembles a silica gel. The calcium silicate thus serves the double purpose of neutralizing acidity and liberating a decolorizing agent which is capable of removing organic coloring matter present in the oil and perhaps assisting in the adsorption of sulfur compounds. I have definitely proven that distillates high in sulfur obtained from a cracking process such as the Dubbs and known to be difficult of purification, can be rendered water white and sulfur free by treatment with the treating agent described by me.

The treating agent used by me should not be confused with a mechanical mixture of calcium hypochlorite and diatomaceous earth inasmuch as my treating agent is an indivisible, especially prepared product of very different characteristics and properties. It is impossible to obtain as intimate relationship between ingredients by mixing as by a chemical reaction or fusion. In the product used by me each particle of diatomaceous earth is coated with a film of calcium hypochlorite and perhaps for this reason it is more reactive. Then again, a mechanical mixture would not contain calcium silicate and I have shown that this compound plays an important part in the process.

In general terms, my invention comprises the treatment of oleaginous liquids, which may have been acid treated and then had most of the acid removed, with a solid treating agent (obtained by causing a reaction between silica and an hydroxide of an alkaline earth and then chlorinating the product), then removing the treating agent from the liquid, and then subjecting the liquid to settling or water washing or both operations. In using my process on vegetable or animal oils, such as cocoanut oil or tallow, it may be best applied on those oils which are not for edible purposes.

It is to be understood that the oil being treated can be brought in contact with the treating agent disclosed above, while the oil is in a liquid state and at any desirable temperature, or under any desirable pressure, and combination of these physical factors, so that the invention therefore embraces the process of bringing the oil in the vapor phase in contact with the treating agent. Or the liquid oil may be brought in contact with the treating agent and the mixture then so manipulated as to convert all or part of the oil to a vapor, which is later condensed to produce a refined and purified product.

What is claimed is as follows:

1. The process of treating oleaginous liquids comprising bringing the liquid to be treated into contact with a pulverulent treating agent obtained by chlorinating the product of reaction between diatomaceous silica and an hydroxide of an alkaline earth, such reaction product containing free alkaline hydroxide, and removing the treating agent from the liquid.

2. The process of treating petroleum oils comprising bringing the oil to be treated into contact with a pulverulent treating agent obtained by chlorinating the product of reaction between finely divided diatomaceous earth and an hydroxide of an alkaline earth, in aqueous suspension; and then separating the treating agent from the oil.

3. The process of removing sulfur from petroleum oils comprising bringing the oil in the presence of water into contact with a pulverulent treating agent obtained by the chlorination of the product of reaction of a mixture of finely divided diatomaceous earth and lime, such mixture containing free alkaline hydroxide prior to its treatment with chlorine; and then separating the treating agent from the oil by filtration.

4. The process of de-sulfurizing and decolorizing petroleum oils comprising mixing the oil, in the presence of water, with a pulverulent treating agent containing available chlorine and obtained by the chlorination of the product of reaction of a mixture of diatomaceous earth and lime, such mixture containing free alkaline hydroxide prior to its treatment with chlorine; subjecting the mixture to filtration to remove the treating agent from the oil; and then subjecting the oil to washing and settling operations.

5. The process of treating petroleum oil, comprising; bringing the oil to be treated into contact with a treating agent comprising finely divided diatomaceous earth having its particles coated with calcium silicate and calcium hypochlorite; and then separating the treating agent from the oil.

6. The process of treating petroleum oil, comprising; bringing the oil to be treated, in the presence of water, into contact with a treating agent comprising finely divided diatomaceous earth having its particles coated with calcium solicate and calcium hypochlorite; separating the treating agent and impurities from the oil by filtration and then subjecting the oil to washing and settling operation.

7. The process of treating petroleum oils, comprising; mixing with the oil to be treated, a lime treated diatomaceous silica containing available chlorine and capable of reacting with acids in the oil so as to liberate silicic acid; agitating the mixture; and then separating the treated oil from the lime treated silica and impurities.

8. The process of treating petroleum oils containing sulfur and unsaturated bodies comprising: bringing oil to be treated into contact with a treating agent comprising finely divided diatomaceous earth having its particles coated with an alkaline earth metal silicate and hypochlorite; oxidizing the unsaturated bodies and sulfur compounds during contact of oil with treating agent; and then separating the treated oil from the treating agent.

9. The process of treating petroleum oils comprising adding to the oil a treating agent made from the product of a mixture of finely divided diatomaceous earth and lime, said product being chlorinated, said resultant agent containing available chlorine; agitating the mixture; and then separating the treating agent from the oil.

In testimony that I claim the foregoing as my own, I affix my signature.

LYLE CALDWELL.